April 20, 1926.
H. S. BARNES
SOFT NOSE SCREW
Filed August 21, 1924
1,581,096
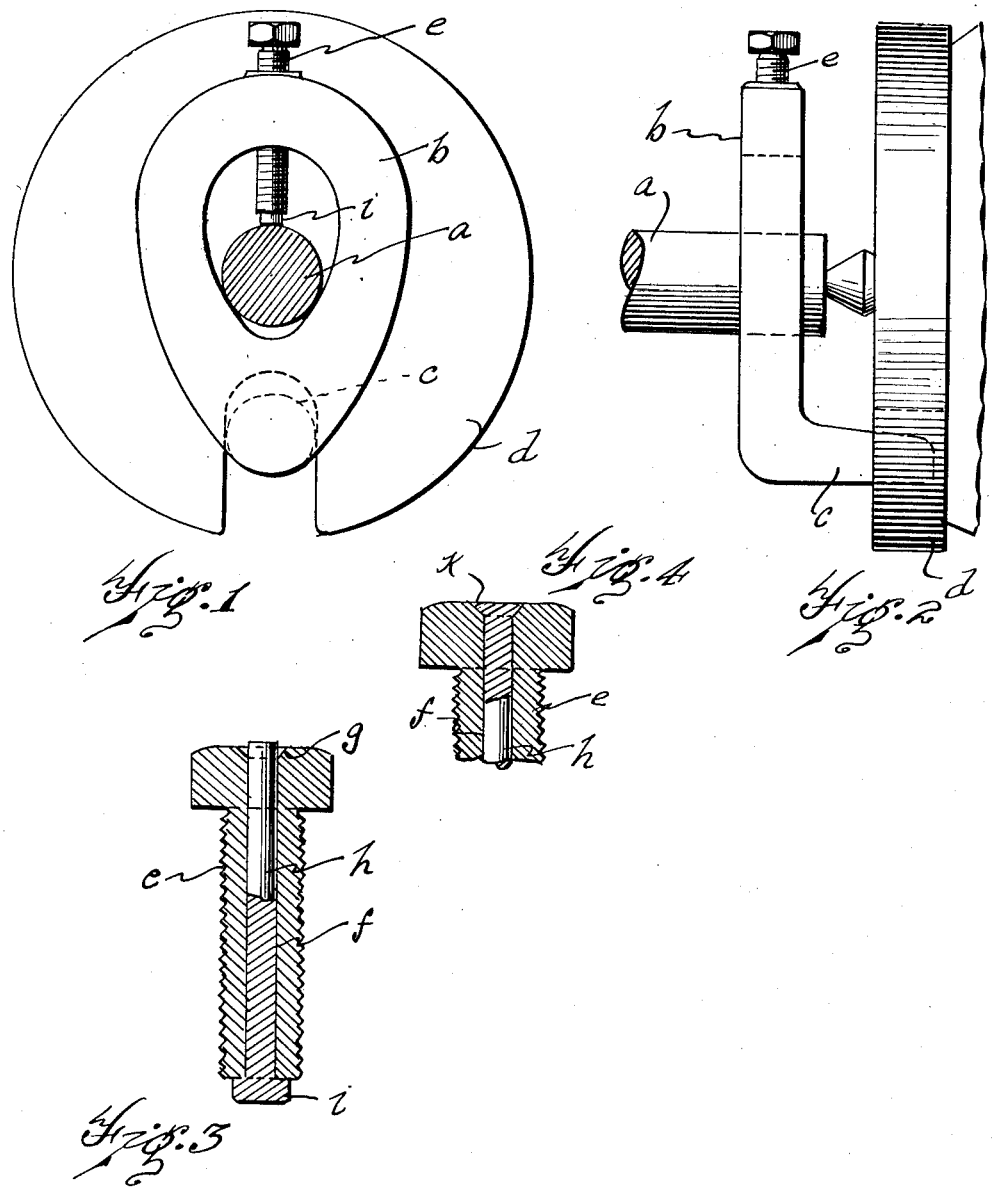
INVENTOR.
Howard S. Barnes
BY
ATTORNEY.

Patented Apr. 20, 1926.

1,581,096

UNITED STATES PATENT OFFICE.

HOWARD S. BARNES, OF REDFORD, MICHIGAN.

SOFT-NOSE SCREW.

Application filed August 21, 1924. Serial No. 733,253.

*To all whom it may concern:*

Be it known that I, HOWARD S. BARNES, a citizen of the United States, residing at Redford, in the county of Wayne and State of Michigan, have invented certain new and useful Improvements in Soft-Nose Screws, of which the following is a specification.

This invention relates to a soft nose screw and has for its object provision of means whereby the ordinary hardened set screw may be provided with a nose of relatively soft metal where the same engages the work to prevent the screw from marring the work.

With the ordinary set screws that are used in securing the work to a driver or dog, the work engaging end of the screw soon becomes worn and forms a mushroom head on the end thereof, thus preventing the screw from being removed from the dog to be replaced by a new screw. In removing such a set screw with a flattened head, it is impossible to remove the same without injuring the threads in the tapped hole in the dog. This necessitates the re-reaming of the dog and a re-tapping and an insertion of an over-size set screw. With my screw, however, it is possible to remove the screw when the work engaging end becomes worn without injuring the threads in the dog.

Another disadvantage of the ordinary set screws is that the screw develops hardened high spots in the work engaging end when it has been used a little while. These high spots which first engage the work will not yield and it is well nigh impossible to obtain a tight grip on the work with an ordinary set screw when it becomes slightly worn. With my soft nose screw the work engaging end of the screw is of relatively soft material which will yield to some extent and permit a tight grip of the work so that the work will not slip in the dog.

Another object of my invention is the means for securing the soft metal plug in the screw which permits an easy and quick removal of the plug when the same becomes worn, thereby allowing the screw to outlast the ordinary set screw, as all the wear is taken up in the removable plug which I have provided.

In the drawings:

Fig. 1 is a front elevational view of the dog or driver with my soft nose screw assembled therein.

Fig. 2 is a side elevation of what is shown in Fig. 1.

Fig. 3 is a sectional view taken through my set screw before the plug is secured thereto.

Fig. 4 is a detail showing how the plug may be riveted to the screw.

In the ordinary machine shop practice, the work *a* is centered between the head stock and tail stock of a grinder or other machine and a dog or driver *b*, which is provided with the extension *c* adapted to engage in the driving head *d* of the machine, is secured about the work and clamped thereto by means of a set screw *e*.

My invention relates to the set screw which will now be described in detail. This screw as shown in Figs. 3 and 4 is provided with a hole *f* passing longitudinally therethrough, the end of the hole near the head being countersunk as at *g*. A plug *h* provided with an enlarged head *i* is inserted in this hole, the shank of the plug fitted inside in the longitudinal hole in the screw which permits the plug to slide or rotate freely therein. The head of the plug projects beyond the work engaging end of the screw and the other end of the plug is given a few taps with a suitable tool which flattens the end of this soft metal plug or spreads the same in the chamfered portion of the screw, as shown at *k* in Fig. 4. This plug may be formed of any suitable soft metal and I have found that brass is very suitable for this purpose, as brass will engage a piece of work without the danger of marring the work and also it may be easily turned over to rivet the same to the screw, as shown in Fig. 4.

When the soft metal plug wears to such an extent that the same does not grip the work satisfactorily, the plug may be removed by a few taps on the rivet end of the plug with a suitable tool, which will break the riveted connection between the plug and the screw and permit the withdrawal of the worn-out plug. A new plug may then be inserted in the screw and riveted in place as above described. This permits the use of a set screw for its full life or until the threads become so worn that they do not efficiently fit into the dog.

It will be seen from the drawings that the head of the plug is of a smaller diameter than the diameter of the shank of the screw. This permits the screw to be threaded in and out of the dog, the head of the plug having sufficient clearance so as not to engage the threads in the tapped hole in the dog. When the plug shown in Figs. 3 and 4 is worn or deformed to such an extent that it does not grip the work satisfactorily, it is easily removed without even removing the screw from the dog. In fact, the head is of such a size that when the same is flattened to a considerable extent it will not engage the threads in the tapped hole in the dog when the screw is removed, but if there is any possible chance of the flattened worm-out end of the head of the plug engaging said threads, it may easily be removed as described without removing the screw from the dog.

My device permits the use of a screw for a much longer time than the ordinary set screw is used. When the soft plug wears it may be replaced by a new plug and the screw is just as good as new. These plugs may be manufactured at very little cost, whereas the ordinary set screw which is threaded and provided with a wrench-engaging head is a more expensive product. Thus my screw is cheaper in the long run and in addition provides a better set screw which is more efficient in that the same grips the work tighter as the soft metal nose of the screw is deformable. In addition, the soft nose of the screw will not mar the work where the screw engages the same. This is especially adaptable when a delicate piece of work is adapted to be secured in the driver or dog, as the ordinary set screw is very liable to mar the work.

When the screw is screwed into the dog the soft nose point will engage the work and the resulting friction will stop the rotating of the point but will allow the screw proper to be further screwed into the dog for tightening the work therein. The advantage of this connection between the screw and the soft nose insert is that the vibration of the machine will not loosen the screw so that the work will come loose.

What I claim is:

1. In a soft nose screw, the combination of a screw provided with a hole passing longitudinally therethrough, a soft metal plug provided with an enlarged head, the shank of said plug slidably secured in the hole in said screw and the head projected beyond the work-engaging end of the screw.

2. In a soft nose screw, the combination of a screw provided with a hole passing longitudinally therethrough, and a deformable metal plug provided with an enlarged head, the shank of said plug slidably secured in the hole in the screw and the head projected beyond the work-engaging end of the screw.

3. In a soft nose screw, the combination of a screw provided with a hole passing longitudinally therethrough, and a soft metal plug provided with an enlarged head, the head of said plug projected beyond the work-engaging end of the screw and the shank slidably passing through said hole and having its end riveted to the head of the screw, whereby the riveted connection may be easily broken by striking the plug with a suitable tool to permit the removal of the plug.

In testimony whereof I have affixed my signature.

HOWARD S. BARNES.